United States Patent
Yi

(10) Patent No.: US 9,492,779 B2
(45) Date of Patent: Nov. 15, 2016

(54) FUEL TANK CAP WITH SEPARATED CHARCOAL CANISTER

(71) Applicant: CHONGQING FENGRUI PLASTIC Co., Ltd., Chongqing (CN)

(72) Inventor: Zhang Yi, Chongqing (CN)

(73) Assignee: CHONGQING FENGRUI PLASTIC Co., Ltd., Chongqing (CN)

( * ) Notice: Subject to any disclaimer, the term of this patent is extended or adjusted under 35 U.S.C. 154(b) by 88 days.

(21) Appl. No.: 14/422,064

(22) PCT Filed: Dec. 8, 2014

(86) PCT No.: PCT/CN2014/093241
§ 371 (c)(1),
(2) Date: Feb. 17, 2015

(87) PCT Pub. No.: WO2016/033895
PCT Pub. Date: Mar. 10, 2016

(65) Prior Publication Data
US 2016/0243489 A1    Aug. 25, 2016

(30) Foreign Application Priority Data
Sep. 1, 2014   (CN) .......................... 2014 1 0441171

(51) Int. Cl.
*B60K 15/05*   (2006.01)
*B01D 53/04*   (2006.01)
(Continued)

(52) U.S. Cl.
CPC .......... *B01D 53/0423* (2013.01); *B60K 15/05* (2013.01); *B65D 51/1616* (2013.01);
(Continued)

(58) Field of Classification Search
CPC .......... B01D 53/0423; B01D 53/0407; B01D 2253/102; B01D 2257/708; B01D 2259/4516; B65D 51/1616; F17C 11/00; F17C 13/06; B60K 15/05
USPC ............. 96/108, 134, 147; 95/146; 220/303, 220/DIG. 33
See application file for complete search history.

(56) References Cited

U.S. PATENT DOCUMENTS 3,825,147 A * 7/1974 Noponen ........... B60K 15/0406
                                                        220/203.24
3,961,724 A * 6/1976 Kapsy ................ B60K 15/0406
                                                        220/303

(Continued)

FOREIGN PATENT DOCUMENTS

CN    202108629 U    1/2012
CN    202381202 U    8/2012

(Continued)

*Primary Examiner* — Frank Lawrence
(74) *Attorney, Agent, or Firm* — Andrew W. Chu; Craft Chu PLLC

(57) ABSTRACT

The fuel tank cap with a separated charcoal canister includes a fuel tank cap, a charcoal cap, and a fuel tank outer cap. A filling room is disposed on the charcoal cap, and the upper opening of the filling room is covered by the fuel tank outer cap. The fuel tank cap with a slot is disposed under of the charcoal cap. The fuel tank can be connected in detachable way with either the charcoal cap or fuel tank outer cap. A through orifice is disposed in the center of the fuel tank cap. The through orifice and the filling room filled by fuel-absorption substrate are connected by the first passageway disposed on the charcoal cap. The charcoal canister is a standard product, and it can fit to variable fuel tanks through the variable sized fuel tank cap, thereby both design and manufacturing processes are simplified and costs are saved.

10 Claims, 2 Drawing Sheets

(51) Int. Cl.
*F17C 11/00* (2006.01)
*F17C 13/06* (2006.01)
*B65D 51/16* (2006.01)

(52) U.S. Cl.
CPC ............. *F17C11/007* (2013.01); *F17C 13/06* (2013.01); *B01D 2253/102* (2013.01); *B01D 2257/708* (2013.01); *B01D 2259/4516* (2013.01)

(56) References Cited

U.S. PATENT DOCUMENTS 8,096,438 B2    1/2012  Schmalz
8,561,826 B2 *  10/2013 Wang ................. F02M 25/0854
                                                220/367.1
2006/0016436 A1* 1/2006 Groom ................. F02M 25/08
                                                123/520
2007/0108212 A1* 5/2007 Nelson ............ B60K 15/03504
                                                220/371
2011/0290118 A1* 12/2011 Tanaka ................ B60K 15/04
                                                96/139

FOREIGN PATENT DOCUMENTS

CN    202970960 U    6/2013
CN    204124534 U    1/2015

* cited by examiner

FUEL TANK CAP WITH SEPARATED CHARCOAL CANISTER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a kind of fuel tank cap with separated charcoal canister.

2. Description of Related Art Including Information Disclosed Under 37 CFR 1.97 and 37 CFR 1.98

In the current market, the universality of most fuel tank caps is not ideal. Variable fuel tanks need variable fuel tank caps with charcoal canisters. Too many fuel tank cap categories cause an increase of costs.

SUMMARY OF THE INVENTION

The present invention is to solve the technology problem by a kind of fuel tank cap with a separated charcoal canister.

The present invention solves the above problem by a technical solution as follows: a kind of fuel tank cap with a separated charcoal canister comprises fuel tank cap, charcoal cap, and fuel tank outer cap. The filling room with an upper opening is disposed in the center of the charcoal cap. Said fuel tank outer cap covering the upper opening of the filling room is disposed above the charcoal cap. The fuel tank cap with a slot connecting with the fuel tank is disposed under of the charcoal cap. The fuel tank cap can be connected in a detachable way with both the charcoal cap and the fuel tank outer cap, or either the charcoal cap or the fuel tank outer cap. A through orifice is disposed in the center of fuel tank cap. The through orifice and the filling room are connected by a first passageway disposed on the charcoal cap. The fuel-absorption substrate is filled in the filling room.

The present invention has the advantages of solving the technical problem. The present invention aims to design the charcoal canister (comprised by the charcoal cap and the fuel tank outer cap) as a standard product. The same charcoal canister can be connected with variable fuel tanks through variable sized fuel tank caps. The joint between the charcoal canister and fuel tank cap is designed as a standard product. Thereby, to connect with different fuel tank, it is only needed to change the fuel tank cap. Both design and the manufacturing process of the fuel tank cap are relatively simpler, moreover, the joints are standard. By this way, both design and manufacturing process are simplified and cost is saved.

DETAILED DESCRIPTION OF THE DRAWINGS

The following descriptions of the embodiments and their accompanying figures of the present invention are intended to illustrate and not to limit this invention.

Figure 1:
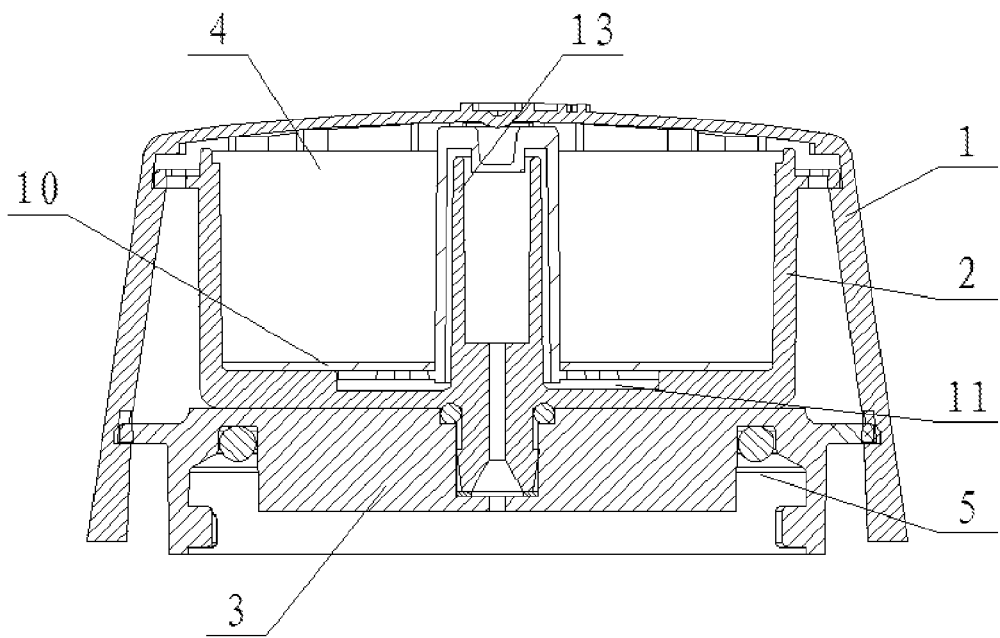
FIG. 1 is a cross-sectional view of the present invention.
Figure 2:
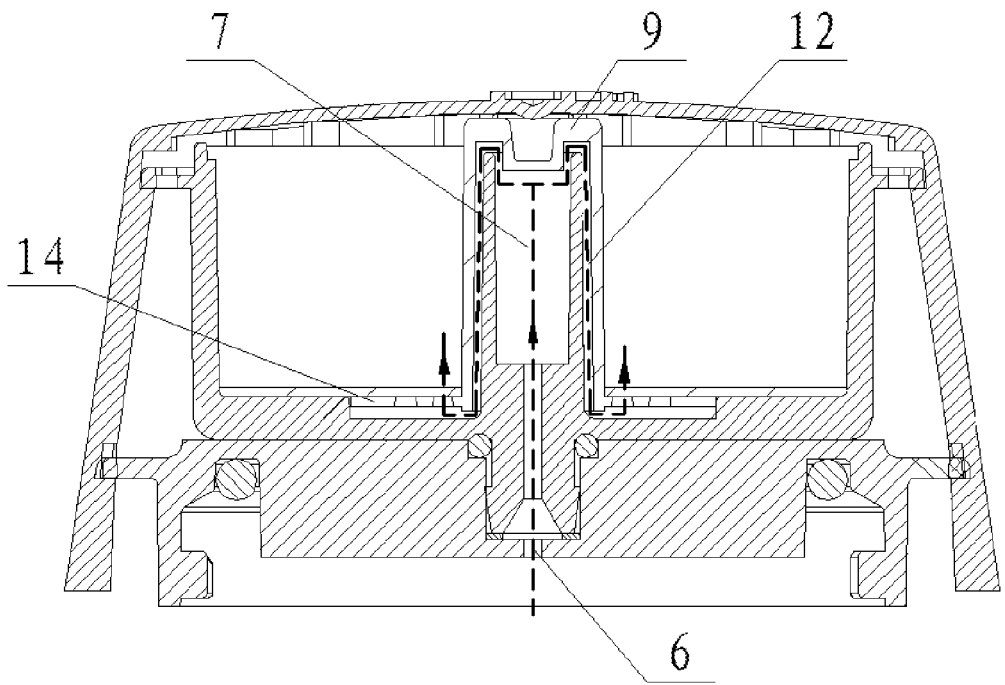
FIG. 2 is another cross-sectional view showing the flow of fuel vapor in the present invention.
Figure 3:
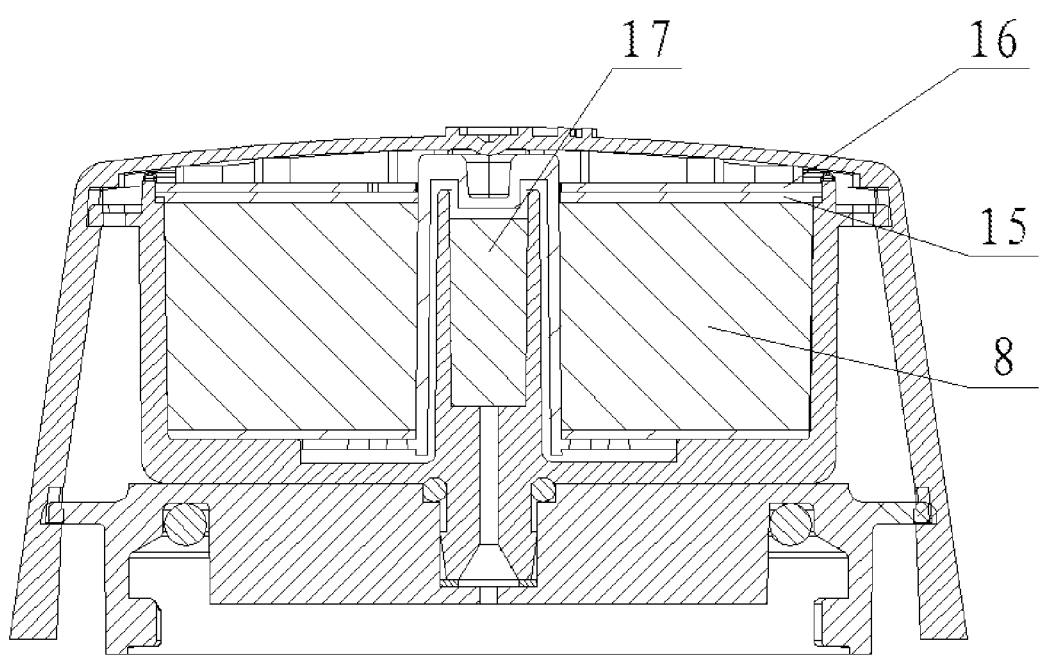
FIG. 3 is another cross-sectional view of the invention with a fuel-absorption substrate.

FIG. 1, FIG. 2, and FIG. 3 show a kind of fuel tank cap with a separated charcoal canister, comprising a charcoal canister, and a fuel tank cap 3. The charcoal canister comprises fuel tank outer cap 1 and a charcoal cap 2. A filling room 4 with an upper opening is disposed in the center of the charcoal cap 2. The fuel tank outer cap 1 is above of the charcoal cap 2, and the upper opening of the filling room 4 is covered by the fuel tank outer cap 1. The fuel tank outer cap 1 and charcoal cap 2 are non-hermetically connected to make it very easy to discharge the filtered fuel vapor to the atmosphere. The interior wall of the fuel tank outer cap 1 and the outer wall of the charcoal cap 2 can be connected by clamping. The fuel tank cap 3 with a slot connecting the fuel tank is disposed under of the charcoal cap 2, and it is preferred that the O-ring is inside of the slot 5. The fuel tank cap 3 can be connected in a detachable way with both or either of the charcoal cap 2 and the fuel tank outer cap 1. The through orifice 6 is disposed in the center of the fuel tank cap 3. The through orifice 6 and the filling room 4 are connected by the first passageway 7 disposed on the charcoal cap 2. The volatilized fuel vapor is leaded by the first passageway 7 to the filling room 4, then passes through the fuel-absorption substrate 8 in the filling room 4 to the atmosphere, thus achieving the goal of controlling emission, and reducing pollution. The fuel-absorption substrate 8 is filled in the filling room 4.

The invention also comprises the ventilating tube 9 disposed in the charcoal cap 2. The ventilating tube 9 with the first breathing panel 10 on its bottom is overlapped to the outlet of the first passageway 7. The containing room 11 is made up by the first breathing panel 10, the bottom of the charcoal cap 2, and the interior wall of the charcoal cap 2. The second passageway 12 disposed between the inside wall of the ventilating tube 9 and the inside wall of the filling room 4 connects its outlet with the containing room 11. The second passageway 12 functions to: (1) slow down the flow of fuel vapor in the 1st passageway 7 by changing its direction; (2) prolong the filtering time of the fuel vapor in the charcoal cap 2 for better absorption; and (3) lead fuel vapor to the containing room 11 to make room for little liquid fuel stored in the containing room 11. The fuel-absorption substrate 8 filled in said filling room 4 is disposed above the first breathing panel 10.

The column 13 is disposed on the bottom of charcoal cap 2. The upper end of the column 13 is disposed inside of the filling room 4 through the containing room 11 surrounding the bottom end of the column 13. The bottom end of the ventilating tube 9 is disposed inside of the containing room 11. The first passageway 7 passes through the column 13. The ventilating tube 9 is overlapped to the column 13. The interior wall of the ventilating tube 9 and the outer wall of the column 13 comprise the second passageway 12. In this embodiment the interior wall of the ventilating tube 9 and the outer wall of the column 13 are not required to be hermetically connected. Since the column 13 is overlapped by the ventilating tube 9 completely, and the bottom outlet of the ventilating tube 9 is completely inside of the containing room 11, then all fuel vapor in the first passageway 7 can enter the containing room 11.

The bottom end of the column 13 is disposed inside of the fuel tank cap 3 in a detachable way. The seal ring is disposed on the joint between the bottom end of the column 13 and the fuel tank cap 3.

In embodiments, the supporting panel 14 is disposed under the first breathing panel 10 and above the second passageway 12, thereby the bottom outlet of the ventilating tube 9 is inside of the containing room 11. A plurality of pores is disposed on the supporting panel 14. Through the first breathing panel 10, the fuel vapor enters the filling room 4. The supporting panel 14 is fixed with the outer wall of the ventilating tube 9. The supporting panel 14 can be round-shaped, further, cylinder- shaped, whereof the height of the cylinder is same as the depth of the containing room 11, to insert into the containing room 11. The upper surface of the supporting panel 14 (also the upper surface of the round) is at the same level of the bottom surface of the filling room 4, thereby the first breathing panel 10 can be laid down evenly (in some embodiments, the first breathing panel 10 covers both the upper outlet of the containing room 11 and the bottom surface of the filling room 4.). In some embodiments, the supporting panel 14 and the ventilating tube 9 can be integrated molded.

In embodiments, the second breathing panel 15 covering the fuel-absorption substrate 8 is disposed above the upper opening of the filling room 4 to prevent the leakage of the fuel-absorption substrate 8. In embodiments, the surrounding platform embedding the second breathing panel 15 is disposed around the upper opening of the filling room 4, the protrusion pushing the second breathing panel 15 downwards is disposed at the bottom of the fuel tank outer cap 1, and the surrounding platform supporting the second breathing panel 15 is disposed on the ventilating tube 9. The upper end of the ventilating tube 9 can either or not pass through the second breathing panel 15. In this embodiment, the ventilating tube 9 passes through the second breathing panel 15 until the bottom of the fuel tank outer cap 1, thereby the ventilating tube 9 can support both the second breathing panel 15 and the fuel tank outer cap 1.The separating panel 16 is disposed above the second breathing panel 15, and between the fuel tank outer cap 1 and the second breathing panel 15, thereby the second breathing panel 15 can be pressed to prevent the leakage of the fuel-absorption substrate 8.

In embodiments, the breathing foam 17 is disposed within the column 13, and on the way of the second passageway 12, thereby the flow of fuel vapor can be slowed down. The separating panel can be disposed on the second passageway 12, and the breathing foam 17 can be disposed either above or under of the separating panel. In this embodiment, the separating panel is not disposed on the second passageway 12.

In embodiments, the fuel-absorption substrate 8 is activated charcoal.

During the operation, first assemble the fuel tank cap 3 with the fuel tank properly, then assemble the charcoal canister (the charcoal cap 2 of the charcoal canister) with the fuel tank cap 3. The charcoal canister is a standard product. Buffered by the breathing foam 17, and re-directed to the charcoal cap 2 by the ventilating tube 9, the little fuel vapor from the fuel tank enters into the activated charcoal and get filtered, then be discharged to the atmosphere through the second breathing panel 15. The charcoal canister and the fuel tank cap 3 are independent with each other, and the same charcoal canister can fit to variable fuel tank cap 3. The manufacturing process is simplified and cost is saved. Re-directed by the ventilating tube 9, and influenced by the negative pressure of the fuel tank, the little liquid fuel entering into the containing room 11 will return back to the fuel tank along the flow of the liquid fuel/fuel vapor. The charcoal powder can play better filtering performance since it is exempted from long time fuel soaking.

The above-described preferred embodiments of the present invention is not intended to limit the present invention, any modification within the spirit and principles of the present invention, made by the equivalent replacement, improvement, etc., should be included in the protection of the present invention within the range.

I claim:

1. A fuel tank cap comprising:
   a fuel tank cap,
   a charcoal cap, and
   a fuel tank outer cap;
   wherein a filling room with an upper opening is disposed in a center of said charcoal cap,
   wherein said fuel tank outer cap covering the upper opening of said filling room is disposed above said charcoal cap,
   wherein said fuel tank cap with a slot connecting with the fuel tank is disposed under of said charcoal cap,
   wherein said fuel tank cap connects in a detachable way with both said charcoal cap and said fuel tank outer cap, or either said charcoal cap or said fuel tank outer cap,
   wherein a through orifice is disposed in the center of said fuel tank cap,
   wherein said through orifice and said filling room are connected by a first passageway disposed on the charcoal cap, and
   wherein a fuel-absorption substrate is filled in said filling room.

2. A fuel tank cap, according to claim 1, further comprising a ventilating tube disposed in said charcoal cap,
   wherein said ventilating tube with a first breathing panel on its bottom is overlapped to the outlet of said first passageway,
   wherein the containing room is comprised of said first breathing panel, the bottom of said charcoal cap, and the interior wall of said charcoal cap,
   wherein a second passageway between the inside wall of said the ventilating tube and the inside wall of said filling room connects its outlet with said containing room, and
   wherein said fuel-absorption substrate is disposed above of said first breathing panel.

3. A fuel tank cap according to claim 2, further comprising a column disposed on the bottom of said charcoal cap,
   wherein an upper end of said column is disposed inside of the said filling room through said containing room surrounding the bottom end of said column,
   wherein a bottom end of the said ventilating tube is disposed inside of said containing room,
   wherein said first passageway passes through said column,
   wherein said ventilating tube is overlapped to said column, and
   wherein an interior wall of the said ventilating tube and the outer wall of the said column consist the said second passageway.

4. A fuel tank cap according to claim 3, wherein the bottom end of the said column is disposed inside of said fuel tank cap in a detachable way.

5. A fuel tank cap according to claim 1, wherein said fuel-absorption substrate is activated charcoal.

6. A fuel tank cap according to claim 1, further comprising a second breathing panel covering the fuel-absorption substrate, said second breathing panel being disposed above the upper opening of said filling room.

7. A fuel tank cap according to claim 6, further comprising a surrounding platform embedding the second breathing panel disposed around the upper opening of said filling room,
- wherein a protrusion pushing said second breathing panel downwards is disposed at the bottom of said fuel tank outer cap, and
- wherein the surrounding platform supporting the second breathing panel is disposed on said ventilating tube.

8. A fuel tank cap according to claim 2, further comprising a supporting panel with a plurality of pores disposed under said first breathing panel, said supporting panel being fixed with the outer wall of said ventilating tube.

9. A fuel tank cap according to claim 8, wherein said supporting panel and said ventilating tube are integrated molded.

10. A fuel tank cap according to claim 3, further comprising a breathing foam disposed within said column, and on the way of the second passageway.

\* \* \* \* \*